United States Patent [19]
Booth et al.

[11] 3,828,524
[45] Aug. 13, 1974

[54] CENTRIFUGAL LYOPHOBIC SEPARATOR

[75] Inventors: Franklin W. Booth, Hampton; Robert A. Bruce, Newport News, both of Va.

[73] Assignee: The United States of America as represented by the Administrator of the National Aeronautics and Space Administration, Washington, D.C.

[22] Filed: Aug. 9, 1971

[21] Appl. No.: 169,962

[52] U.S. Cl............................ 55/43, 55/159, 55/199
[51] Int. Cl............................................. B01d 19/00
[58] Field of Search........... 55/36, 52, 55, 199, 421, 55/431, 432, 400, 408, 43, 159; 233/2, 13, 16, 32, 44

[56] References Cited
UNITED STATES PATENTS

| | | | |
|---|---|---|---|
| 3,224,173 | 12/1965 | Webb | 55/432 |
| 3,240,003 | 3/1966 | Stroup et al. | 55/408 |
| 3,276,679 | 10/1966 | Booth | 55/408 |
| 3,523,408 | 8/1970 | Rosenberg | 55/159 |

Primary Examiner—Charles N. Hart
Attorney, Agent, or Firm—Howard J. Osborn; John R. Manning

[57] ABSTRACT

A centrifugal separator using a lyophobic filter for removing liquid particles from a mixed stream of gas and liquid under various negative or positive external acceleration conditions as well as zero $g$ or weightless conditions. Rotating the lyophobic filter and inclining the filter to the entering flow improves the lyophobic properties of the filter, provides gross separation of larger liquid particles and prevents prolonged contact of liquid droplets with the spinning filter which might change the filter properties or block the filter.

33 Claims, 5 Drawing Figures

PATENTED AUG 13 1974

INVENTORS
FRANKLIN W. BOOTH
ROBERT A. BRUCE
BY
Howard J. Osborn
ATTORNEY

CENTRIFUGAL LYOPHOBIC SEPARATOR

ORIGIN OF THE INVENTION

The invention described herein was made by employees of the National Aeronautics and Space Administration and may be used and manufactured by the Government for governmental purposes without the payment of any royalties thereon or therefor.

BACKGROUND OF THE INVENTION

This invention relates to a centrifugal separator and more particularly to a separator of aerosols from a mixed stream of gas and liquid utilizing both centrifugal force and a lyophobic filter. The use of lyophobic filters to separate liquid aerosols from a gas stream is known in the art. Using both lyophobic filtration and centrifugal force however, has several advantages over the use of either method of separation by itself.

Some liquids can convert to a lyophobic material to a lyophilic material after several minutes of surface contact. Urine, for example, forms a protein deposit upon lyophobic material which gives the material lyophilic properties. Rotating the filter produces centrifugal force which can prevent contact between the lyophobic filter and liquid particles which might alter the lyophobic properties of the filter. Rotation also provides gross separation of the heavier liquid particles and concentration of the smaller particles.

Manned spacecraft life support systems must collect urine during flights, such as that planned for PROJECT SKYLAB. The urine, which is collected and transported by means of an airstream, must be efficiently separated from the air in a zero gravity ($g$) environment for measurement and sampling and for the potential reprocessing of urine to potable water on future, longer duration missions. The air must not contain urine aerosols since the air is eventually recirculated through the spacecraft cabin for breathing. The need for efficient separation of the urine from the airstream, the effect of prolonged contact between the urine and the lyophobic filter, and the zero $g$ conditions of space led to the design of the novel separator described herein.

SUMMARY OF THE INVENTION

The novel separator includes a stator body through which inlet and exit lines pass. Within the stator, connected to and disposed about a rotating shaft are a container with inclined walls leading to a collector cavity, a deflector cone having capillary channels at its base, a truncated conical lyophobic filter within the deflector cone and suction air exit passages leading to an air exit line and suction pump.

The inlet flow, comprised of liquid transported by a gas, enters the rotating container. The outer surface of the deflector cone deflects the droplets in the entering mixture and prevents immediate contact with the lyophobic filter. The heavier aerosols are immediately made to flow outward to the outer container walls after contacting the spinning deflector cone. The remaining gas mixture then circulates to enter an opening between the deflector cone and the conical lyophobic filter. The lip of this opening is shaped to deflect larger liquid particles toward the inner wall of the deflector cone. Any liquid droplets contacting the filter will immediately be flung outward against the inside surface of the deflector cone. Vanes on the inner surface of the deflector cone channel the liquid to the base of the cone where the liquid escapes through capillary channels in the cone to the sides of the cup. The capillary channels are designed for outflow only and liquid in the container cannot flow back through these openings. Blades within the container guide the liquid to the collecting cavity where the liquid is forced to exit the cup via a pitot exit tube. A check valve in the line from the pitot exit tube maintains a backpressure against the escaping liquid. Positive liquid pressure is required to open the check valve thus preventing the escape of gas or gas mixture from the container through the pitot. To prevent splashing from the pitot exit tube directly into the opening between the deflector cone and the filter, fins shaped to direct any splash toward the outer container wall are placed on a radial arm portion of the pitot exit tube.

The gas from the gas mixture is drawn through the lyophobic filter and through suction air exit passage by a blower. The blower also serves to pressurize the sealed space between the stator and rotor so that the stator and rotor seals will not leak fluid.

Rotation of a lyophobic filter improves the lyophobic properties of the filter. Centrifugal force at the filter surface acts to oppose passage of liquid droplets through the filter and thus is, in effect, equivalent to an increase in the tensile holding strength of the liquid interface in the pores of the filter. This equivalent increase in tensile strength or increased negative capillary force resists the differential motive force of the liquid droplets more effectively than if the filter were stationary. Moreover, the vector resolution of the mixture velocity as it impinges at a point on the filter and the tangential velocity of the point due to filter rotation results in an acute angle of flow impact. This acute angle of flow impact means that the effective pore size, as seen by the flow, is decreased. A smaller effective port size and more equivalent liquid surface tensile holding power results in improved lyophobic properties in the filter.

When the surface of the rotating filter is inclined to the flow, some further gains in reduced effective pore size are realized with lower rotational speeds. Areas of the filter which are near the axis of rotation are blocked to prevent filtration in areas of low centrifugal force and large effective pore size. For example, the lyophobic filter might comprise the sloping sides of the frustum of a cone rotated about its conic axis rather than the entire cone since the apex area would experience little centrifugal force.

The advantages of the present invention are made obvious by a consideration of results. In current tests, less than 1 percent air (approximately one quarter of 1 percent) has been found in the separated liquid while no measurable amounts of liquid can be found in the escaping airstream.

The present invention has been operated successfully in all orientations in a normal $1g$ field, as well as in zero gravity aircraft trajectories, and the separator is believed capable of a wider range of operating $g$ load.

It is therefore an object of the present invention to provide a simple, compact, lightweight separator for aerosols from a gaseous stream having a high efficiency which avoids prolonged contact with the liquid to be separated and is unaffected by $g$ loading. It is a further object of the invention to improve the properties of a lyophobic filter so as to restrict the passage of smaller liquid droplets for a given pore size and to restrict the passage of liquid at a higher liquid droplet motive force.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DESCRIPTION OF THE PREFERRED EMBODIMENT

Figure 1:
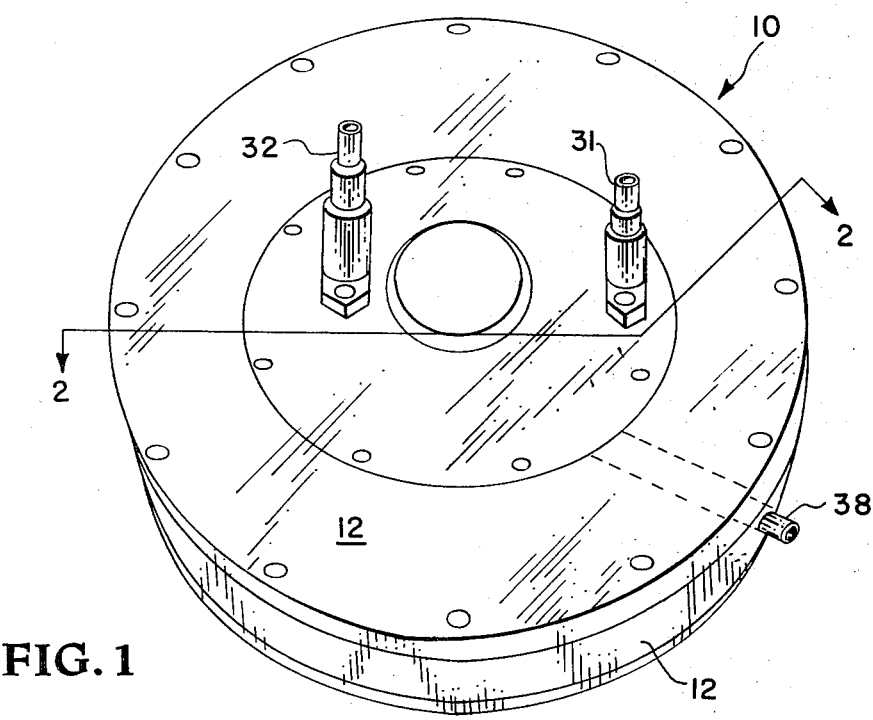
FIG. 1 is a perspective view of the preferred embodiment of the novel separator.

Referring now more particularly to the drawings wherein the numerals designate identical parts throughout the several views, and more particularly to FIG. 1, there is shown the novel separator 10 having a stator housing 12, a mixture inlet 32, a liquid exit line 31, and a gas outlet line 38.

Figure 2:
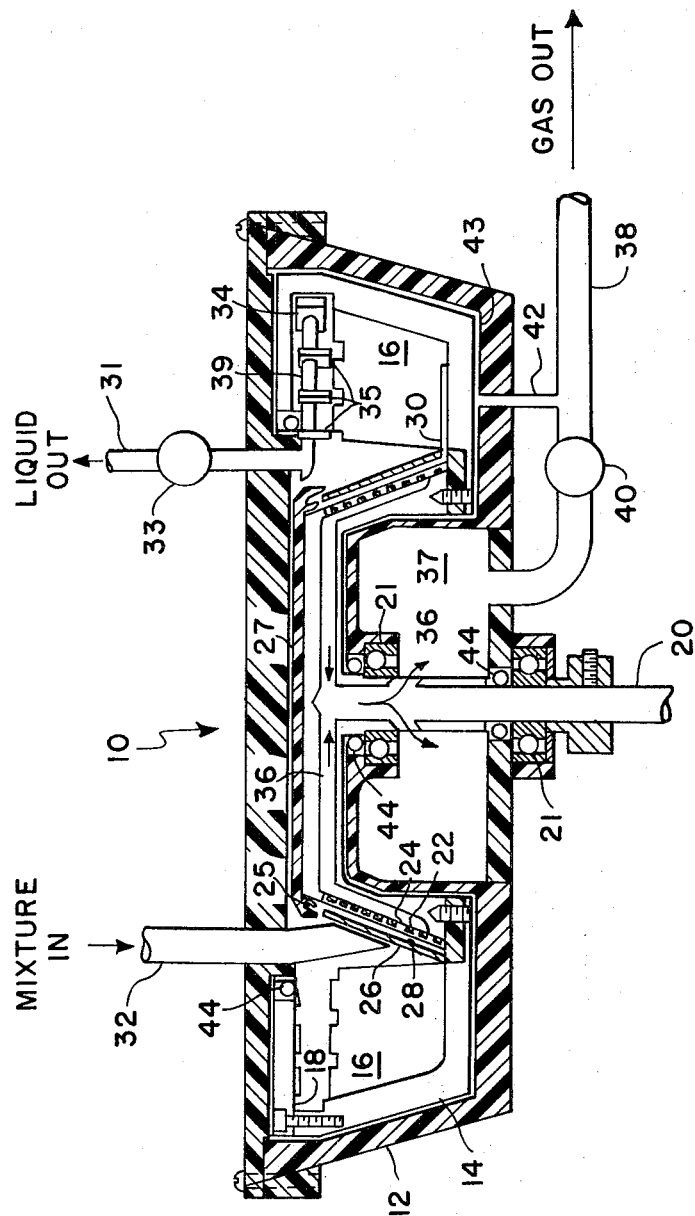
FIG. 2 is a sectional view of the preferred embodiment taken along section line 2—2 of FIG. 1.

The cross-sectional view in FIG. 2 of the novel separator 10 shows the stator housing 12, and a rotating annular container 14 containing several blades 16 positioned perpendicular to the container and radially alined and distributed within the container 14. Container 14 is rotated by a shaft 20 which turns in bearings 21. A lyophobic filter 24 is carried by a core 22 that is surrounded by a deflector 26, all of which rotate with container 14. Deflector 26 has vanes 28 on its inner surface and the upper edge of deflector 26 projects into a cusped cavity 25 of cap 27 (see FIG. 3). At the base of deflector 26, capillary drain channels 30 provide openings through the deflector walls of the container proper. Suction air passages 36 are located behind filter support member 22 and lead to an annular gas chamber 37, a gas outlet line 38 and suction pump 40. A liquid pitot collection 34 having vanes 35 located on radial-arm portion 39 collects the liquid accumulating in collecting cavity 18. Liquid exit line 31 and a 5 inches-of-water backpressure device 33 receive fluid from pitot collector 34. A space 43 between stator 12 and container 14 is sealed by seals 44 and is pressurized by pressure line 42 from gas outlet 38.

Figure 4:
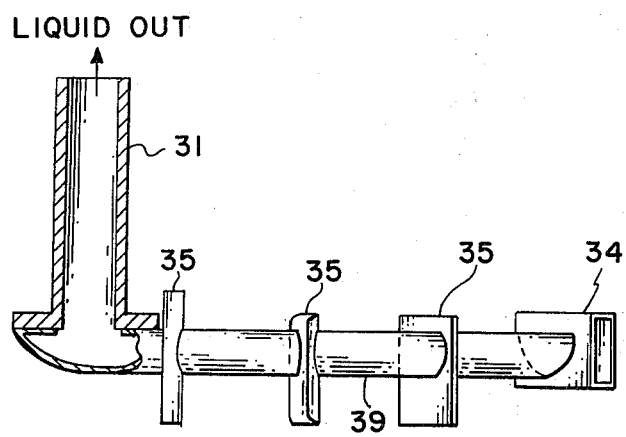
FIG. 4 shows a detail view of the liquid pitot collector and splash suppressing vanes.
Figure 3:
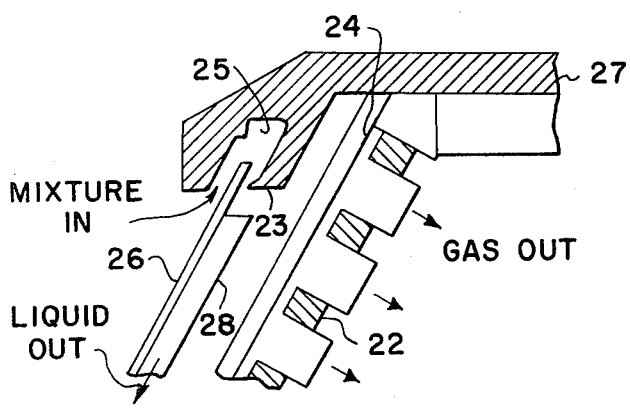
FIG. 3 is a detailed view of the cusped cavity surrounding the upper edge of the deflector on the preferred embodiment.
Figure 5:
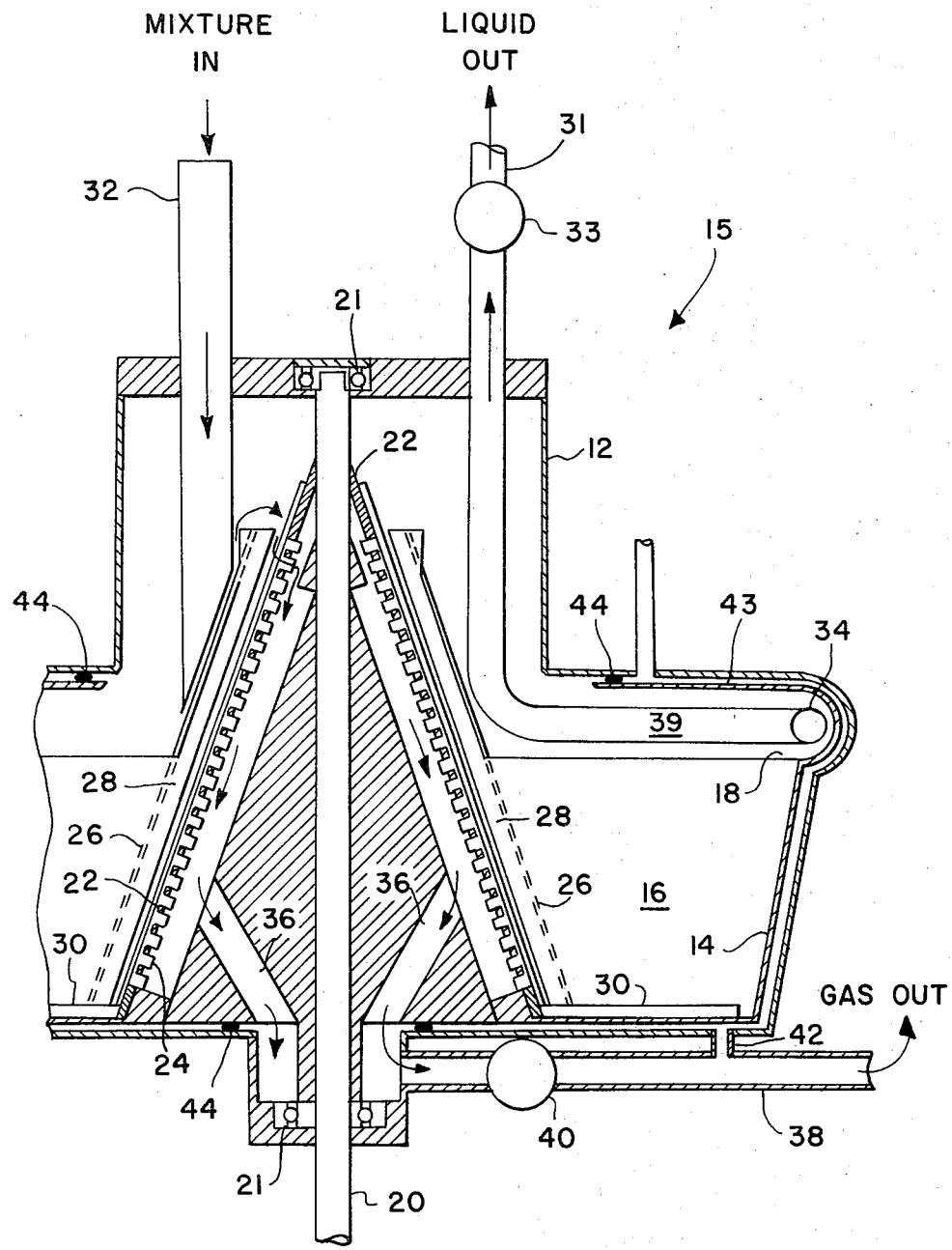
FIG. 5 is a cross-sectional view of another embodiment of the invention.

FIG. 3 shows cusped cavity 25 in more detail. Cusped cavity 25 partly encloses an edge of deflector 26 having vanes 28. The liquid-gas mixture circulates between the filter and the deflector via cusped cavity 25 in cap 27. Filter 24 is attached to cap 27. A cusp 23 forms a protruding lip at the inner edge of the annular cusped cavity 25. Vanes 35 are shown located on the radial arm portion 39 of pitot collector 34 in FIG. 4, and liquid exit line 31 is also shown. FIG. 5 shows an alternate embodiment 15 wherein filter 24 and deflector 26 come to more of a point.

OPERATION

The operation of the novel separator is now believed apparent. Container 14 is rotated by shaft 20. A mixture of gas and liquid enters mixture inlet line 32 where the flow impinges upon the outer surface of deflector cone 26. This flow is directed onto the outer surface of the deflector cone 26 in such a manner that the most of the liquid flows smoothly onto the surface of the cone. This liquid film flows along the surface of the cone 26 in the direction of the larger cone diameter and then along the adjacent surfaces of the rotating container to the collection cavity 18. This process minimizes splatter and the formation of additional aerosols within the separator. The gas and aerosol mixture is made to rotate by the blades 16 within the rotating container 14 and the heavier aerosols are moved to the outer surface of container 14. Smaller droplets remaining in the flow circulate around the upper edge of deflector cone 26 through cusped cavity 25. The cusp 23 on the inner lip of cavity 25 directs most of the droplets in the flow against the inner surface of deflector cone 26. Vanes 28 on the inner surface of deflector cone 26 channel the liquid to the bottom of the cone. Any liquid striking lyophobic filter 24 will likewise be deflected against the vaned inner surface of deflector cone 26.

Liquid at the bottom of the deflector cone 26 escapes radially through drain channels 30 which are capillaries. The capillary force of the channels 30 can only be overcome by centrifugal force so that flow is one way and no liquid passes from the container 14 back into the deflector cone 26 after rotation stops. Liquid is channeled to the container wall by the blades 16 and collects in the collecting cavity 18. A stationary liquid pitot collector 34 collects this liquid for transmission through liquid exit line 31. Backpressure device 33 maintains a back-pressure of 5 inches-of-water which must be overcome by liquid pressure thus preventing the flow of the gas or gas mixture through liquid exit line 31. Since radial arm portion 39 of pitot collector 34 causes some splashing of the liquid, fins 35 direct the splash back toward the container wall and the collecting cavity 18, protecting cusped cavity 25 from splash.

The separated gas is pulled through filter 24 into suction air passages 36, an annular gas chamber 37 and gas outlet line 38 by a blower 40.

The space 43 between container 14 and stator 12 is sealed by seals 44 and is pressurized by a line 42 from gas outlet line 38. Since static pressure in container 14 is slightly below the static pressure in the mixture flow, the pressurization source need not be at a very high pressure, and blower output pressure suffices.

The operation of alternate embodiment 15 shown in FIG. 5 is identical to the above. Since the upper portion of the conical lyophobic filter 24 is not blocked in alternate embodiment 15, some soaking at the top of the filter can result. When urine is the liquid contained in the entering mixture, soaking can convert the filter from lyophobic to lyophilic. Truncating the conical filter and blocking the top of the frustum with cap 27 (separator 10 in FIG. 2) avoids this problem.

Although the invention has been described and illustrated in detail in specific embodiments thereof, it is to be understood that this description is by way of illustration only and is not to be taken as limiting on applicants' invention. Filter material and porosity may be matched depending upon the properties of the constituents of the entering mixture and the rotational speed of the centrifugal separator. Average rotational speed used in the particular embodiments shown was 230 rpm, but various rotational speeds could be used depending upon the constituents to be separated.

What is claimed as new and desired to be secured by Letters Patent of the United States is:

1. A centrifugal separator for separating a mixture of gas and liquid comprising: a housing; a rotating member having an axis of rotation disposed within the housing; a nonwettable porous means attached to said rotating member and disposed about said axis of rotation, said nonwettable porous means admitting gas and restricting the passage of liquid through said nonwettable porous means, whereby the gas is completely separated from the liquid and the liquid completely separated from the gas.

2. The centrifugal separator of claim 1 including deflector means attached to said rotating member and spaced from and partially surrounding said nonwettable porous means, said deflector means for shielding said nonwettable porous means from direct contact with the mixture of gas and liquid as the mixture enters said rotating member.

3. The centrifugal separator of claim 2 wherein said deflector means includes drain means for providing one way flow of liquid from within said deflector means outward by centrifugal action to said rotating member.

4. The centrifugal separator of claim 3 wherein said drain means are capillary channels.

5. The centrifugal separator of claim 3 wherein said deflector means includes an inner surface and said inner surface includes guide means for channeling liquid over said inner surface.

6. The centrifugal separator of claim 1 including cap means attached to said nonwettable porous means, said cap means blocking an area of said nonwettable porous means near said axis of rotation.

7. The centrifugal separator of claim 6 including deflector means attached to said rotating member and spaced from and partially surrounding said nonwettable porous means, said deflector means for shielding said nonwettable porous means from direct contact with the mixture of liquid and gas entering said rotating member and wherein said cap means includes a cavity partly enclosing an edge of said deflector means and cusp means projecting into said cavity, said cusp means for directing the flow of the mixture circulating between said deflector means and said nonwettable porous means, whereby the liquid droplets entering the cavity are directed against the inside of the deflector means.

8. The centrifugal separator of claim 1 wherein the housing surrounding said rotating member does not rotate; a space between said housing and said rotating member; seal means located between said housing and said rotating member for preventing the passage of fluid between said rotating member and said space; gas outlet means attached to said housing for removing gas passing through said nonwettable means; and pressure seal line means connecting said space and said gas outlet means, said pressure seal line means for pressurizing said space and for preventing the passage of fluid from said rotating member into said space.

9. The centrifugal separator of claim 1 including liquid pitot collector means disposed within said rotating member and for removing liquid from said rotating member, said liquid pitot collector means including means for creating a backpressure, whereby a positive liquid pressure is required for liquid exit from said rotating member and gas may not escape said rotating member through said liquid pitot collector means.

10. The separator of claim 1 wherein said nonwettable porous means includes a surface, said surface being three-dimensionally shaped.

11. The separator of claim 10 wherein said surface comprises a body of revolution having an axis along said axis of rotation.

12. The separator of claim 10 wherein said surface forms a truncated cone.

13. The separator of claim 10 including deflector means attached to said rotating member and for shielding said nonwettable porous means from direct contact with the mixture of gas and liquid entering said rotating member.

14. The centrifugal separator of claim 13 wherein said deflector means includes drain means for providing one way flow of liquid from within said deflector means to said rotating member.

15. The centrifugal separator of claim 14 wherein said deflector means includes an inner surface and said inner surface includes guide means attached to said inner surface for channeling liquid over said inner surface whereby the liquid passes through said drain means into said rotating member.

16. The centrifugal separator of claim 15 including cap means attached to said nonwettable porous means, said cap means for blocking an area of said nonwettable porous means near said axis of rotation, said cap means including a cavity partly enclosing an edge of said deflector means and cusp means projecting into said cavity, said cusp means for directing the flow of the mixture circulating between said deflector means and said nonwettable porous means, whereby the liquid droplets entering the cavity are directed against said inner surface.

17. The centrifugal separator of claim 16 wherein said housing does not rotate and surrounds said rotating member; a space between said housing and said rotating member; seal means located between said housing and said rotating member for preventing the passage of fluid between said rotating member and said space; gas outlet means attached to said housing for removing gas passing through said nonwettable porous means; pressure seal line means connecting said space and said gas outlet means, said pressure seal line means for pressurizing said space and for preventing the passage of fluid from said container member into said space; liquid pitot collector means disposed within said rotating member and for removing liquid from said rotating member, said liquid pitot collector means including means for creating a backpressure, whereby a positive liquid pressure is required for liquid exit from said rotating member and gas may not escape said rotating member through said liquid pitot collector means.

18. The centrifugal separator of claim 17 wherein said surface forms a truncated cone, said drain means are capillary channels and said guide means are vanes projecting from said inner surface.

19. A method of improving the lyophobic efficiency of lyophobic filter subjected to a flow of a mixture of gas and liquid having a flow direction comprising the step of: rotating the lyophobic filter about an axis of rotation; whereby the equivalent filter pore size as seen by the flow is decreased.

20. The method of claim 19 including the further step of inclining the surface of the lyophobic filter such that the surface is approximately perpendicular to the flow direction.

21. The method of claim 19 including the further step of inclining the surface of said lyophobic filter such that the surface and the flow direction form an acute angle.

22. The method of claim 19 including the further step of blocking the surface of said rotating lyophobic filter near said axis of rotation to prevent areas of the filter surface experiencing low centrifugal force from filtering the mixture.

23. The method of claim 21 including the further step of blocking the surface of said rotating lyophobic filter near said axis of rotation to prevent an area of the filter surface experiencing low centrifugal force from filtering the mixture.

24. A method of separating gas and liquid from a mixture of gas and liquid comprising the steps of: providing a flow of the mixture having a flow direction: interposing a lyophobic filter in said flow to filter the liquid out of the mixture, rotating said filter about an axis of rotation to improve the lyophobic properties of the filter; and recovering essentially pure gas and essentially pure liquid ingredients of the mixture.

25. The method of claim 24 including the further step of inclining the surface of the lyophobic filter approximately perpendicular to the flow direction.

26. The method of claim 24 including the further step of inclining the surface of the lyophobic filter at an acute angle to the flow direction.

27. The method of claim 24 including the further step of blocking the surface of said lyophobic filter near said axis of rotation to prevent an area of the filter experiencing low centrifugal force from filtering the mixture.

28. The method of claim 24 including the further steps of shielding the lyophobic filter with a deflector from direct contact by the flow; and circulating the mixture after said mixture has struck the deflector, through a space between the deflector and the filter.

29. The method of claim 28 including the further step of depositing the flow of the mixture against said deflector in such a manner as to minimize splatter.

30. The method of claim 28 including the further step of rotating the deflector to provide gross separation of liquid, whereby the heavier liquid droplets entering the separator are made to flow outward by contact with the outer surface of the deflector and recovered in a container.

31. The method of claim 30 including the further steps of depositing the flow of the mixture against said deflector in such a manner as to minimize splatter, trapping the liquid thrown outward by the rotating lyophobic filter against the inner surface of said deflector and channeling the liquid within said deflector into a container.

32. The method of claim 31 including the further step of blocking the surface of said lyophobic filter near said axis of rotation to prevent an area of the filter experiencing low centrifugal force from filtering the mixture.

33. The method of claim 32 including the steps of providing a rotating container, a fixed housing surrounding said container, and a seal between said container and said housing; pressurizing said seal to prevent the mixture or any ingredient from escaping said container; providing a liquid exit; and restricting the recovery of separated liquid through said liquid exit so that a positive pressure is required for recovery of the liquid whereby gas cannot escape through the liquid exit.

* * * * *